Aug. 22, 1961  B. M. COLE  2,997,684
SOLDERING HANDLE
Filed March 9, 1959  2 Sheets-Sheet 1
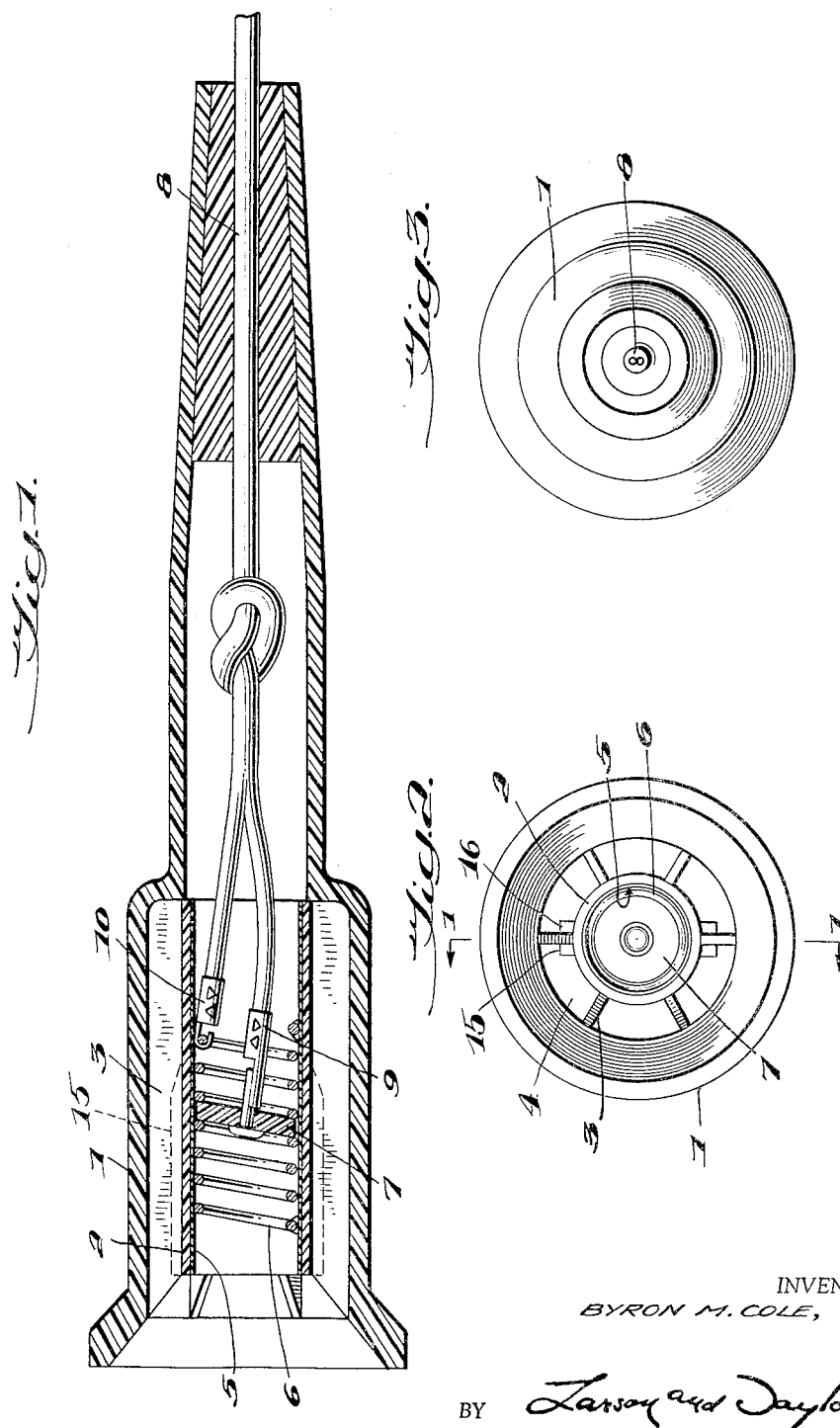
INVENTOR
BYRON M. COLE,
BY Larson and Taylor
ATTORNEYS

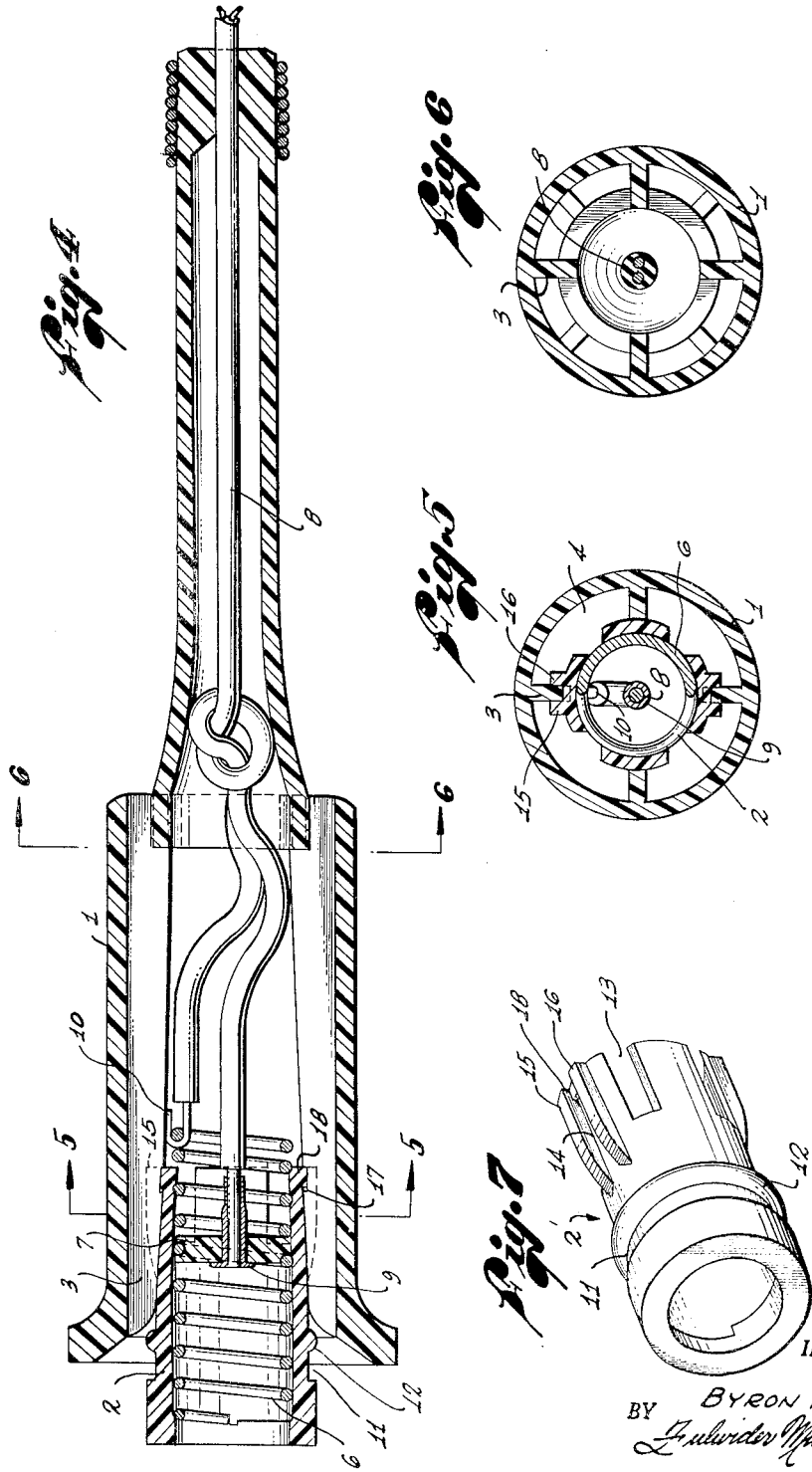

United States Patent Office 2,997,684
Patented Aug. 22, 1961

2,997,684
SOLDERING HANDLE
Byron M. Cole, 10604 Louise Ave., Granada Hills, Calif.
Filed Mar. 9, 1959, Ser. No. 798,300
4 Claims. (Cl. 339—110)

The invention described herein is concerned with holders for electrical heating elements, such as electrically heated soldering irons. More in particular, the invention relates to a holder adapted to carry heating elements having a screw-in type base.

The invention has an an object the provision of a holder which furnishes a tight mounting for the screw-in base of the heating element. Another object of the invention is to provide such a holder which is simple in construction and comprises a small number of parts. Accordingly, the holder will have a low production cost and involve minimum tooling costs to put it into production. Still another object of the invention is to provide a holder which will demonstrate cool handle operation. Additional objects will become apparent from the description following and the claims appended thereto.

The holder for electrical heating elements according to the invention essentially comprises handle means including a tubular member, a helical spring secured at each of its ends within the tubular member, a washer mounted centrally within this spring, and means connected to the washer and the spring for conveying electricity to the heating element base. The holder is so adapted that the screw-in base of the heating element engages the washer to distend one portion of the spring and compress a second portion whereby a jam-fit of the base is acquired within the tubular member. In a preferred embodiment, the washer is insulative and the rim thereof is correspondingly threaded with the helix of the spring. The washer, according to this embodiment, is threaded to a central plane within the spring.

Moreover, according to this embodiment, the handle means further comprises a hollow handle, the tubular member being separated from this handle by an annular space. Radial ribs are used to join the tubular member with the hollow handle.

The preferred embodiment and an alternative embodiment are better illustrated by way of the drawings accompanying this description. The drawing will be seen to include seven figures, wherein like numbers are used for like parts throughout and wherein:

FIGURE 1 is a vertical cross-section of the holder taken along the line 1—1 of FIGURE 2;
FIGURE 2 is a front elevational view of the holder;
FIGURE 3 is a rear elevational view of the holder.
FIGURE 4 is a view similar to FIGURE 1, showing an alternate embodiment of the invention.
FIGURE 5 is a sectional view taken on the line 5—5 of FIGURE 4.
FIGURE 6 is a sectional view taken on the line 6—6 of FIGURE 4.
FIGURE 7 is a perspective view of the collet type insert member, shown in FIGURE 4.

Turning to FIGURES 1 and 2, the holder will be seen to include a hollow tubular handle 1 within which a tubular member 2 is mounted. The two tubular shells are joined by radial ribs 3. Intermediate of these radial ribs 3 is an annular space 4, permitting free passage of cooling air between the shells. This air provides convection cooling when the handle is in use for soldering purposes.

Secured to the internal wall of the tubular member 2 is a thin tubular sheet 5 of material capable of withstanding high temperatures, such as silicone impregnated fiber glass, or Mylar. This sheet 5 is ordinarily secured with adhesive cement. Mounted within this sheet 5 is a helical spring 6 which is significantly secured only at each of its ends to the thin sheet 5. Morevover, the spring 6 has the same pitch and diameter as the screw-in base of the heating element to be mounted within the holder.

The thin tubular sheet 5 may be eliminated if the tubular member 2 is molded in such a manner as to provide a collet type clamp on one end and a groove on the other. In this case adhesive cements are not required.

This alternative arrangement for mounting helical spring 6 is shown in FIGURES 4 through 7 to be described below. In particular, attention is drawn to insert tubular member 2' in FIGURE 7, having collet forming slots 13 at its rear end and a groove 11 at the forward end to form shoulder 12 which seats against ribs 3 as a stop.

Centrally mounted within the spring 6 in both embodiments is a washer 7. The washer is insulative and its outside rim is correspondingly grooved or threaded with the helix of the spring 6. This washer 7 will be seen to play a highly significant part in the tight mounting of the screw-in base of the heating element.

Entering the hollow handle 1 from its rear is an electrical line cord 8 which is bifurcated at its forward end so as to be connected to both the washer and the rear portion of the spring. A standard eyelet 9 is inserted through the small hole at the center of the washer 7. One lead of the line cord 8 is connected to this eyelet on the rear side of the washer 7. The eyelet 9 is so mounted in the washer hole that it cannot be ejected in a forward direction. The second lead of the line cord 8 is fastened through eyelet 10 to the rear portion of the spring 6.

It is also contemplated that the rear of the hollow handle 1 has an aperture of flat cross-section corresponding to that of standard zip-type wire. Accordingly, the wire or line cord 8 cannot twist internally and damage the electrical connections. Furthermore, the line cord can be provided with a strain relief consisting of a simple knot in the cord inside of the flat aperture at the rear of the handle. Alternatively, a strain relief bushing can be mounted within the rear of the handle, said bushing having an aperture of flat cross-section. Again, the knot is formed inside of this bushing.

In operation, the screw-in base of the heating element is threaded into the forward end of the helical spring 6 until it abuts the insulative washer 7. As screw engagement continues, by virtue of the spring 6 being secured only at its ends, the washer 7 is pushed toward the rear of the holder, thus compressing the spring portion between the washer 7 and the rear of the holder, and elongating the spring portion between the washer 7 and the front of the holder. The result is to make efficient use of the spring body to place a large amount of spring tension on the screw-in base and the soldering iron. If the base is sufficiently extended into the spring, the elongation of the spring causes crossing of threads and thus permit a jam-fit of the base within the spring. In addition, the compressed portion of the spring, through the washer 7, exerts relatively high spring force against the base. The composite result of the jamming action and/or the spring tension is the attainment of an extremely tight assembly of holder and screw-in base. Yet only a relatively small number of components has been employed to achieve this result.

By the same token, it can be seen that the assembly of these components is a very simple matter. The hollow handle 1 with the ribs 3 as well as the tubular member 2 can be in the form of molded plastic elements. As seen in FIGURE 4, by suitably tapering the ribs 3 and providing slots 14 on the tubular member 2, the spring 6 can be clamped securely when the tubular member 2 is pushed into the hollow handle 1. These slots 14 are formed between upstanding ribs 15 and 16 on tubular member 2, as may be best seen in FIGURES 2 and 7. Of course, in the embodiment of FIGURE 1, the spring 6, as noted above, is simply secured to liner sheet 5 and need not be clamped. Similarly, in FIGURE 1, tubular member 2 may simply be cemented to ribs 3. In assembly of either embodiment with this molded element, the line cord 8 is passed through the rear end of the molded element and carried out through the forward end. The relief knot is then tied. The eyelet 9 is next placed through the washer hole from its front. A standard crimping tool is used to crimp the lead to this eyelet. The helical spring 6 is then screwed on the assembly of washer, eyelet, and line cord, for an appropriate number of turns. And the second lead is attached by eyelet 10 to the spring 6. Next the spring assembly is inserted into tubular member 2 or 2' as far as it will go. Tubular member 2 containing the entire assembly is worked into the hollow handle 1. Member 2 may be cemented in place, or as shown in FIGURES 4–7, the tapered ribs 3 compress the slotted portions 13 of the tubular member 2 until notches 17 are reached in the ribs. At this point, small prongs 18 on tubular member 2 snap into place completing the assembly. In this arrangement, although cement may also be used, the tube 2 is locked in position by the seating of shoulder 12 against ribs 3 and the seating of prongs 18 in notches 17. The slight protrusion of tube 2 out of the forward end of handle 1 affords additional cooling action.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A holder for an electrical heating element having a screw base, comprising handle means including a tubular member, a helical spring secured at each of its ends within said member, a washer mounted centrally within said spring, and means connected to said washer and said spring for conveying electricity to said base, said base being adapted to engage said washer to distend one portion of said spring and compress a second portion whereby a jam-fit of said base in said member can be acquired.

2. A holder according to claim 1 wherein said washer is insulative and the rim thereof is correspondingly threaded with the helix of said spring, said washer being threaded to a central plane within said spring.

3. A holder according to claim 1 wherein said handle means further comprises a hollow handle, said tubular member being separated from said handle by an annular space.

4. Mounting and connector means to receive an electrical element having a screw threaded base comprising: a hollow mounting member; a helical spring mounted inside said member and secured thereto only at the ends of said spring, said spring having the same pitch and diameter as said screw base to threadedly receive said base therein; an insulative washer centrally and transversely mounted within the threads of said spring; an electrical terminal positioned centrally in said washer; means to make a first electrical connection to said terminal; and means to make a second electrical connection to said spring, said centrally mounted washer being axially yieldable under screw pressure exerted by said threaded base to thereby compress the portion of the spring in back of said washer and extend the portion of the spring in front of said washer to securely hold said base in position under spring tension.

References Cited in the file of this patent

UNITED STATES PATENTS

| | | |
|---|---|---|
| 1,657,253 | Fortin | Jan. 24, 1928 |
| 1,845,638 | Wermine | Feb. 16, 1932 |
| 2,253,593 | Warren | Aug. 26, 1941 |
| 2,734,996 | Rogow et al. | Feb. 14, 1956 |
| 2,807,789 | McCann | Sept. 24, 1957 |